(12) United States Patent
Beeck et al.

(10) Patent No.: US 7,770,136 B2
(45) Date of Patent: Aug. 3, 2010

(54) GESTURE RECOGNITION INTERACTIVE FEEDBACK

(75) Inventors: Langdon W. Beeck, Redmond, WA (US); Kevin A. Kennedy, Kirkland, WA (US); Charles R. Bilow, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 11/626,794

(22) Filed: Jan. 24, 2007

(65) Prior Publication Data

US 2008/0178126 A1 Jul. 24, 2008

(51) Int. Cl.
*G06F 3/033* (2006.01)
(52) U.S. Cl. ........................ 715/863; 715/866
(58) Field of Classification Search .................. 715/863
See application file for complete search history.

(56) References Cited

U.S. PATENT DOCUMENTS

| | | | |
|---|---|---|---|
| 6,115,482 A | 9/2000 | Sears et al. | |
| 6,256,033 B1 | 7/2001 | Nguyen | |
| 6,421,453 B1 | 7/2002 | Kanevsky et al. | |
| 6,868,383 B1 | 3/2005 | Bangalore et al. | |
| 7,042,442 B1 | 5/2006 | Kanevsky et al. | |
| 7,096,454 B2 | 8/2006 | Damm et al. | |
| 2003/0007018 A1* | 1/2003 | Seni et al. | 345/864 |
| 2004/0068409 A1 | 4/2004 | Tanaka et al. | |
| 2004/0070573 A1* | 4/2004 | Graham | 345/179 |
| 2005/0190973 A1 | 9/2005 | Kristensson et al. | |
| 2006/0031786 A1 | 2/2006 | Hillis et al. | |
| 2006/0055685 A1 | 3/2006 | Rimas-Ribikauskas et al. | |
| 2006/0253793 A1 | 11/2006 | Zhai et al. | |
| 2007/0075978 A1* | 4/2007 | Chung | 345/173 |

FOREIGN PATENT DOCUMENTS

GB 2423808 A 6/2006

OTHER PUBLICATIONS

Tomer Moscovich, "Multi-touch Interaction," Brown University.*
Juan Pablo Hourcade, "Architecture and Implementation of a Java Package for Multiple Input Devices (MID)," May 1999.*
Sensei: A Real-Time Recognition, Feedback and Training System for T'ai Chi Gestures; David Alan Becker, Jun. 1993, http://citeseer.ist.psu.edu/cache/papers/cs/405/ftp:zSzzSzwhitechapel.media.mit.eduzSzpubzSztech-reporterszSzTR-426.pdf/becker97sensei.pdf (50 pages).
Contextual Recognition of Head Gestures; Louis-Philippe Morency, Candace Sidner, Christopher Lee, Trevor Darrell, Oct. 4-6, 2005, Trento, Italy; http://delivery.acm.org/10.1145/1090000/1088470/p18-morency.pdf?key1=1088470&key2=8870534611&coll=portal&dl=ACM&CFID=11111111&CFTOKEN=2222222 (7 pages).

(Continued)

*Primary Examiner*—William L Bashore
*Assistant Examiner*—Daniel Um
(74) *Attorney, Agent, or Firm*—Workman Nydegger

(57) ABSTRACT

Example embodiments provide for (i) suggesting proper gesture sequences based on a user's initial gesture input; and/or (ii) providing visual or other gesture example(s), which may alternatively be compared with the user's mimic thereof. For example, a user may input a gesture into a touch/display surface. Based on the user's movement, recognized or proper application gesture commands are suggested. In other embodiments, a tutorial session may be presented to the user for teaching or educating the user on numerous types of gestures. As such, a visual representation of a gesture example may be presented to the user, and feedback provided based on the user's mimicking thereof.

20 Claims, 4 Drawing Sheets

OTHER PUBLICATIONS

VirHKey: A VIRtual Hyperbolic KEYboard with Gesture Interaction and Visual Feedback for Mobile Devices, Benoit Martin; http://delivery.acm.org/10.1145/1090000/1085794/p99-martin. pdf?key1=1085794&key2=4890534611&coll=portal&dl=ACM&CFID=11111111&CFTOKEN=2222222 (8 pages).

* cited by examiner

GESTURE RECOGNITION INTERACTIVE FEEDBACK

BACKGROUND

Computers are used all over the world to perform a wide variety of tasks (e.g., word processing, scheduling, database management, etc.) that prior to the advent of computer systems were performed manually. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability; and thus may be considered computing systems. To enable some of the advantages features provided by such devices, computer systems often come equipped with various interfaces that allow users to input data or commands that when executed by a processor achieve a desired result (i.e., produce some output to produce the effects of the users' manipulation).

Commonly known input interfaces include key entry pads (e.g., keyboard, telephone dial, push button, etc.), touch pads, or some form of mouse; and output interfaces typically include some type of display—along with other functional output. More recently, the input and output interfaces have been combined to reduce the number of peripheral devices needed for the computer system and provide for a more intuitive user experience. For example, touch-screens or touch panels are display overlays, which have the ability to display and receive information on the same screen. The effect of such overlays allows a display to be used as an input device, removing the keyboard and/or the mouse as the primary input device for interacting with the display's content.

Touch-screen technology includes a number of different types (e.g., resistive, surface wave, capacitive, infrared, etc.) and can take numerous forms of inputs. In the past, touch-screens were limited to offering simplistic, button-like touch selection input interfaces. More recently, however, gesture interfaces have been developed, which accept input in the form of hand/stylus movement. Such movement may include any combination of single or multiple finger or stylus tapping, pressure, waving, lifting, or other type of motion on or near the screen's surface. Such movement when performed in a certain order and/or pattern will be interpreted by the touch surface computer as a particular type of input. Each different gesture, however, may be interpreted differently across different types of platform systems and/or even across different types of computing applications. As such, a user may be confused or uncertain as to how appropriately to interact with a particular gesture recognition program.

For example, a user might touch a window displayed in the touch panel at opposite sides of the window with two fingers and drag each finger towards the other finger. This input could be interpreted by program X as a "close window" command, while program Y might interpret this gesture as a "draw line" command. Moreover, as gestures increase in complexity (e.g., by incorporating various combinations of ordered touches, drags, pressure-sensitive touches, etc.), users are becoming more apprehensive and confused about how to enter gestures and knowing how those gestures will be interpreted by the software program.

BRIEF SUMMARY

The above-identified deficiencies and drawbacks of current gesture recognition systems are overcome through example embodiments of the present invention. For example, embodiments described herein include mechanisms for suggesting to a user one or more recognized application gesture commands based the user's interaction with a motion-sensitive display surface (e.g., a touch-screen). More specifically, embodiments provide an interactive system that: (i) suggests proper gesture sequences based on a users initial gesture input; and/or (ii) a training mode that provides a visual or other gesture example, and that may alternatively compare the example with user's mimic thereof Note that this Summary is provided to introduce a selection of concepts in a simplified form that are further described below in the Detailed Description. This Summary, however, is not intended to identify key features or essential features of the claimed subject matter, nor is it intended to be used as an aid in determining the scope of the claimed subject matter.

One example embodiment provides for a mechanism that suggests recognized application gesture commands based on a user interaction with a surface of a motion-sensitive display in order to give the user various options and/or instructions on how to appropriately use the application. In this embodiment, a user-performed gesture is received at a motion-sensitive display surface. Note that the user-performed gesture includes user movement of an object (e.g., hand, stylus, etc.) over the surface that recognizes such a user interaction. Based on the received user-performed gesture, the computer system then identifies gesture command(s) recognized by a program of the motion-sensitive display surface, which represent actual commands of the program that closely resemble those corresponding to the user-performed gesture. Accordingly, a visual feedback is displayed on the motion-sensitive display surface representing the gesture command(s) recognized by the program in order to aid the user in understanding appropriate various defined gestures representing actual program commands.

Another embodiment provides for a gesture recognition tutorial or trainer mechanism that instructs a user on how to properly enter gestures for program commands via a motion-sensitive display surface. In this embodiment, a tutorial program is used to identify gesture command(s) recognized by a program of a motion-sensitive display surface. Note that the motion-sensitive display surface is configured to detect user movement of an object (e.g., a finger, writing utensil, etc.) over the surface that recognizes such user interaction. Based on the identified gesture commands, the tutorial program displays a visual example of a gesture capable of being performed on the motion-sensitive display surface. The visual example of the gesture mimics the motions used by the user for performing the gesture commands of a program associated with the motion-sensitive display surface.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
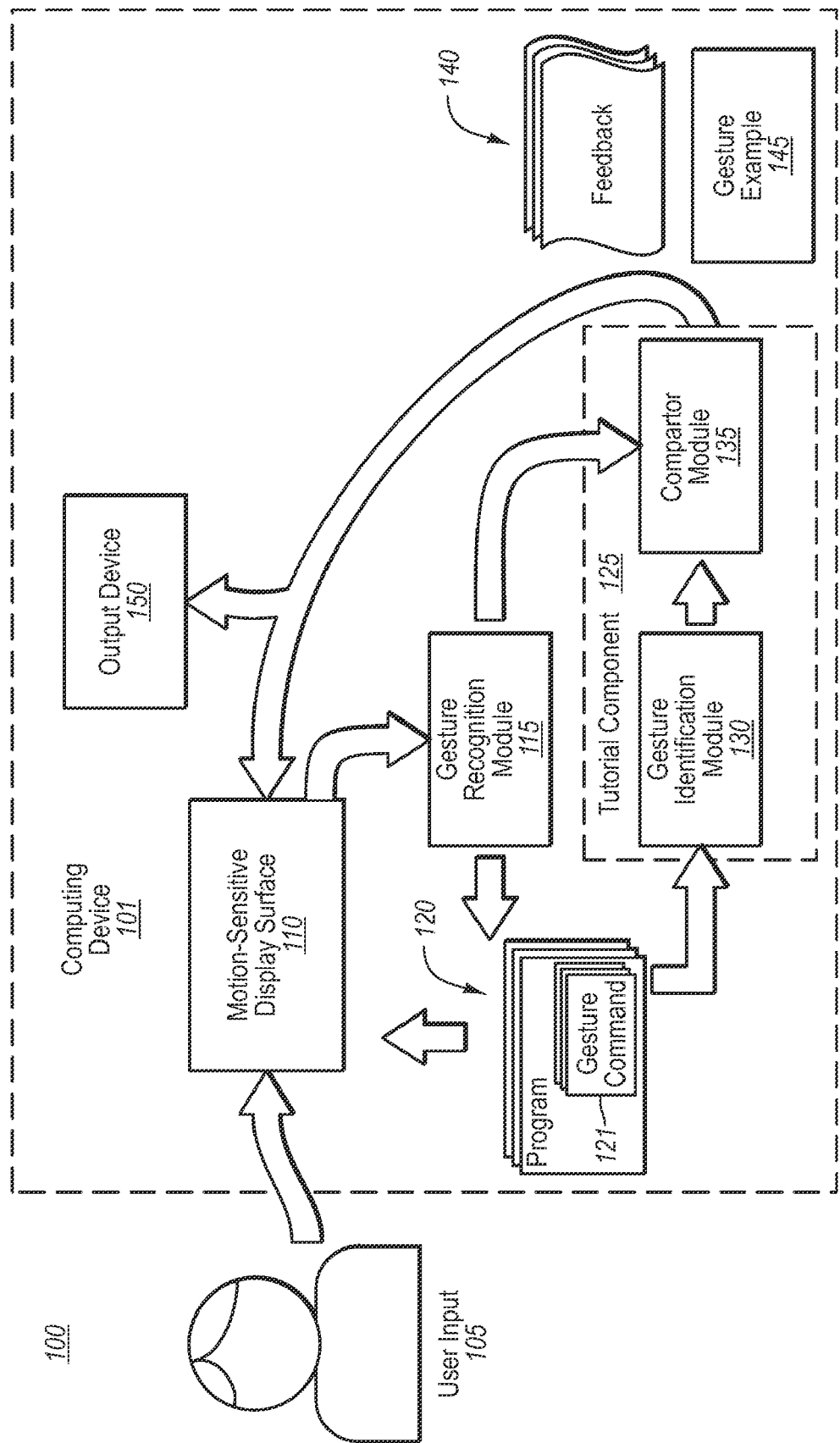
FIG. 1 illustrates computing system configured to (i) suggests proper gesture sequences based on a users initial gesture input; and/or (ii) a training mode that provides a visual or other gesture example, and that may alternative compare the example with user's mimic thereof.

Example embodiments extend to methods, systems, and computer program products that (i) suggest proper gesture sequences based on a user's initial gesture input; and/or (ii) provide visual or other gesture example(s), and that may alternatively compare the example with user's mimic thereof The embodiments of the present invention may comprise a special purpose or general-purpose computer including various computer hardware or modules, as discussed in greater detail below.

As previously mentioned, gesture commands can vary between computing systems, and even among applications of the same system. In addition, as the complexity of gesture commands grows, so does the apprehension and understanding of the user for performing proper gesture commands, and how those commands affect the output of a program. Accordingly, embodiments provide several mechanisms for enhancing a user's experience with gesture recognition systems and educating user(s) on the appropriate use thereof For example, one embodiment provides for a gesture tutorial or training mode system configured to make proper gesture suggestions to users. More specifically, a user may interact with a motion-sensitive display surface (e.g., a touch table) using one or more series of gestures, which may include touching, sliding, waving, or any other similar form of movement or pressure over the surface of the display. Based on the user's movement, recognized application gesture commands are suggested.

For instance, a user may wish to rotate a window of an application about its center axis. As such, the user tries touching the window on two edges and rotates each touched area in a clockwise fashion. An application running the window, however, may not understand the gesture based on such things as the user not touching the window in appropriate areas, improper command, or other similar errors. Accordingly, a tutorial or training module may compare the user input with appropriate gesture commands recognized by the application in an attempt to determine what the user is trying to do. More specifically, the trainer may determine based on various things such as historical data that the user meant to rotate the window. As such, a visual representation of how to properly rotate the window may then be presented to the user.

In other embodiments, a tutorial session may be presented to the user for teaching the user numerous types of gestures. As such, a visual representation of a gesture example may be presented to the user, and feedback provided based on the user's mimicking thereof For instance, in the above window rotation example, visual depressions (similar to the touching of sand or water) may appear on opposite corners of the window, representing finger touching in these corners. Then, a similar depression showing a clockwise rotation motion may also be shown, representing the movement of the fingers. In addition, a label or other text box may be presented to the user indicating that if the user wishes to rotate the window, that the example is the appropriate gesture command. Of course, there may be numerous examples presented to the user and/or other mechanisms for showing the examples. As such, the above and following examples of presenting the user with visual and other feedback in the tutorial and suggestion sessions described herein are for illustrative purposes only and are not meant to limit or otherwise narrow the scope of the present invention unless otherwise explicitly claimed.

Although more specific references to advantageous features are described in greater detail below with regards to the Figures, embodiments herein also include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable-type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

FIG. 1 illustrates a computing environment 100 in which the principles of the present invention may be employed. Computing environment 100 includes computing device 101, which may be any type of computing system or mechanism having any number of processors, modules and/or components stored thereon. As will be appreciated, each processor, module, and/or component may be in a separate computing system or, alternatively, one or more of these devices may be grouped together into various combinations on the same computer. In addition, the processors, modules, and/or components may be implemented using any combination of hardware and/or software mechanisms. In fact, there are a myriad of configurations and combination of hardware and/or software components and modules that may be used to implement embodiments described herein. As such, any particular computer configuration, aesthetic layout, or type of component used to perform various functions described herein are for illustrative purposes only and are not meant to limit or otherwise narrow claimed embodiments.

Regardless of the configuration or components used, computing system 101 is configured to receive user input 105. User input 105 may be any type of motion via a bodily appendage, writing apparatus, stylus or other device that can communicate movement. In some embodiments, user input 105 may be a gesture. A gesture, as used herein, is any type of user movement or placement of an object (e.g., finger, hand, or other appendage, writing utensil, stylus, etc.) over or about a motion-sensitive display surface 10 that recognizes such user interaction therewith. Objects may include, but are not limited to bodily appendages, writing utensils, a stylus, dice, paint brushes, cellular telephones, coins, poker chips, or any radio frequency identification (RFID) tagged object. In some embodiments, surface 110 may be configured to recognize (i) physical objects with added electronics for recognition, (ii) physical objects with a tag adhered to them, (iii) physical objects with a distinct shape, and (iv) physical objects with a distinct appearance. Any of these, or any combination thereof, could be used to input gestures. In other embodiments, a user's gaze may be interpreted as a gesture; more specifically, the direction or movement of the user's eyes may be recognized and interpreted as a gesture. Accordingly, the term "gesture" as used herein should be broadly interpreted to include any type of placement or movement of any arbitrary type of object or appendage.

In addition, the user input need not be in direct contact with the motion-sensitive display surface 110, but may also include motions near the surface 110 as well. In fact, as will be recognized, there exists any number of gestures that a user can perform within the scope of embodiments herein described. Nevertheless, the types and forms of gestures will be described in greater detail below in connection with FIGS. 2, 3, and 4A-C.

As mentioned above, computer environment 100 also includes motion-sensitive display surface 110. In some embodiments, motion-sensitive display surface 110 is configured to receive user input 105 as well as display feedback 140, gesture example(s) 145, and any other software program 120 output that may be running on computing device 101. Motion-sensitive display surface 110 may be any type of motion-sensitive surface including, but not limited to, touch screens or panels, touch tables, video camera based motion recognition devices, or any other device or mechanism capable of detecting and displaying motion. In some embodiments, motion-sensitive display surface 110 may be a touch table. A touch table, as used herein, is a touch-sensitive screen typically housed in a table-shaped structure capable of displaying software programs and allowing complex user interaction with the programs using gestures. Touch tables may also be configured to allow multiple users to interact with the touch table simultaneously. For example, users can interact with a remote computing system, which interaction is then displayed on a local machine. Additionally or alternatively, each user may have a designated space and/or program that is not accessible by others. In some embodiments, motion-sensitive display surface 110 may be configured to display one or more software programs (e.g. program 120) and allow interaction with the programs via user inputs 105.

Computing environment 100 also includes gesture recognition module 115, which can detect and/or interpret gesture commands. For example, the gesture recognition module 115 can receive the user input 105 from the motion-sensitive display surface 10 and recognize that the input 105 is to be interpreted by a program 120 or used as input into tutorial component 125 (which will be described in greater detail below with reference to FIGS. 1 and 3). Program(s) 120 may include multiple hardware and/or software programs, which can take the recognized gesture or user input 105 and, based on the program's gesture command(s) 121, produce a desired output. This output may then be shown in the touch/display 110 or other output device as defined by the gesture command (s) 121. Note that the tutorial component 125 and other elements of computing device 101 are directed toward several advantageous features of embodiments described herein below.

The present invention may also be described in terms of methods comprising functional steps and/or non-functional acts. The following includes some description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIGS. 2 and 3—is used to indicate the desired specific use of such terms.

Figure 2:
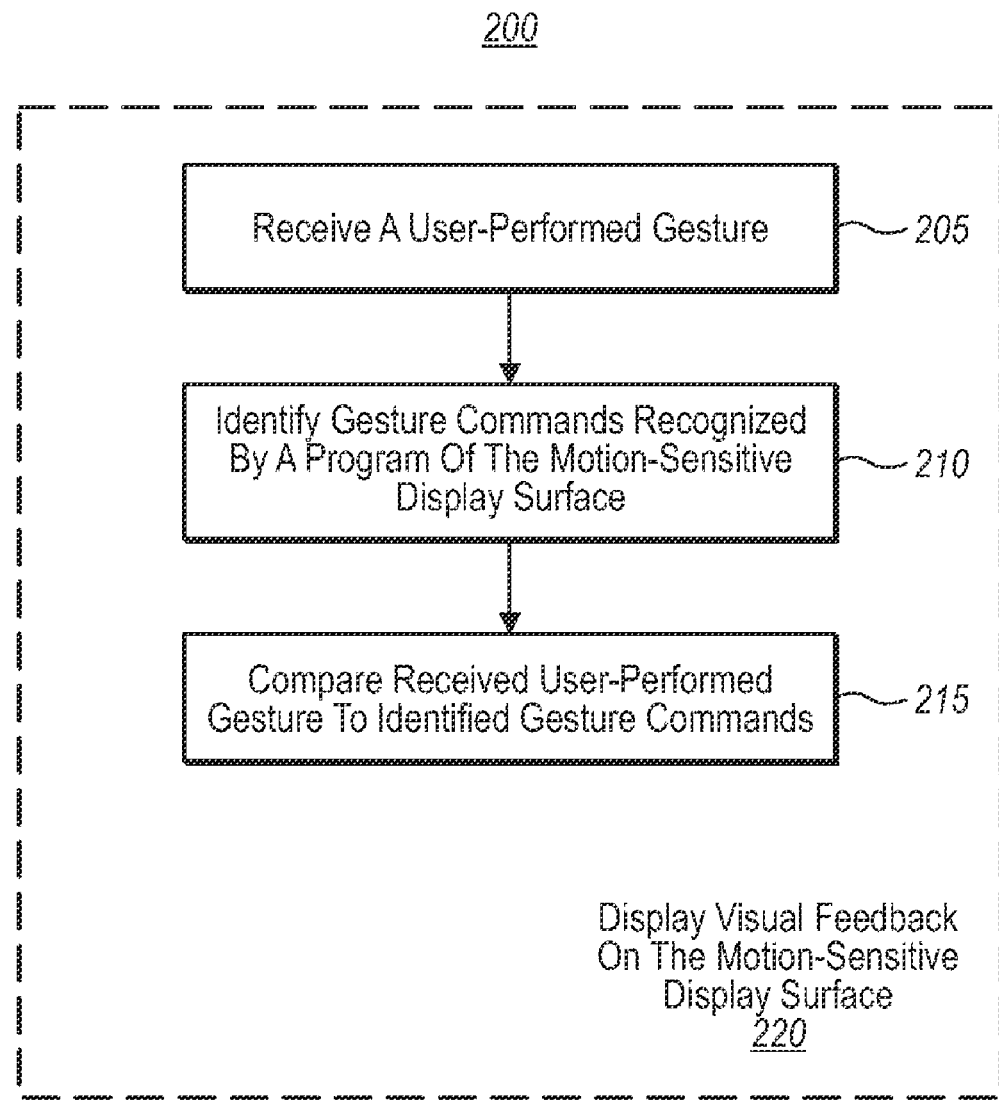
FIG. 2 illustrates an example flowchart of a method for suggesting recognized application gesture commands based on a user interaction with a motion-sensitive display surface.
Figure 3:
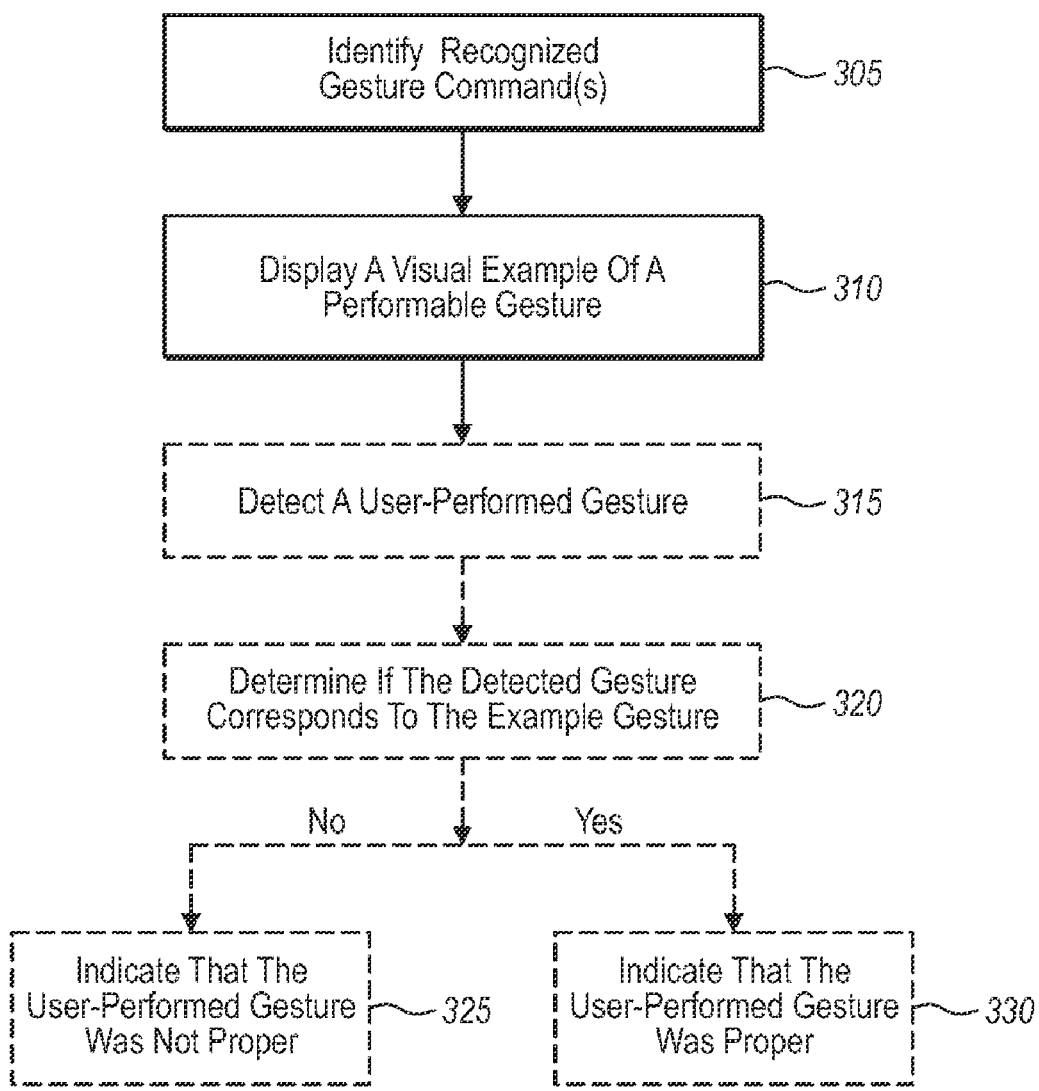
FIG. 3 illustrates an example flowchart of a method for providing a gesture tutorial mechanism for instructing user(s) on how to properly enter program commands via the motion-sensitive display surface using gestures.

As previously mentioned, FIGS. 2 and 3 illustrate flow diagrams for various exemplary embodiments. The following description of FIGS. 2 and 3 will occasionally refer to corresponding elements from FIGS. 1 and 4A-C. Although reference may be made to a specific element from these Figures, such references are used for illustrative purposes only and are not meant to limit or otherwise narrow the scope of the described embodiments unless explicitly claimed.

As previously mentioned the present invention provides for a tutorial or training mode system that can (i) suggest proper gesture sequences based on a user's initial gesture input; and/or (ii) provide visual or other gesture example(s), and that may alternatively compare the example with user's mimic thereof Note that these tutorial or training modes may be the currently executed program 120 itself, or may be used to interact with other programs 120 in a runtime environment. For example, the tutorial component as described below may run in the background for monitoring and suggesting gestures, or may be a standalone application for educating a user on various gesture commands. Of course, as one would recognize, there may be various combinations of environments for executing the tutorial or training mode system described herein.

FIG. 2 illustrates a flowchart of a method 200 for suggesting recognized application gesture commands based on the user interaction with the surface in order to give the user various options and/or instructions on how to appropriately use the application for the motion-sensitive display surface. More specifically, embodiments provide mechanisms for determining such things as to which gesture was most likely intended by the user input. For example, if a user intended to input a double-tap but accidentally inputted a triple-tap, embodiments may determine that the most likely gesture intended by the user was a double-tap. Feedback in the form of visual representation gestures or other type of feedback may then be provided to the user For instance, method 200 includes step for displaying 220 visual feedback on the motion-sensitive display surface. Step for 220 includes an act an act of receiving 205 at a motion-sensitive display surface a user-performed gesture, which includes user movement of an object over the surface (i.e., at or near the surface) that recognizes such user interaction therewith. For example, motion-sensitive display surface 110 may receive user input 105, which includes user movement of an object (e.g., finger, hand, appendage, writing utensil, stylus, or other similar objects) over the surface 110.

In some embodiments, user input 105 includes movements such as tapping, touching, touching and holding, sliding, dragging, waving, flicking, rubbing, peeling, increasing finger pressure to increase the diameter of the finger, two-finger motions toward each other, apart from each other, circling each other, or any other type of movement or combination of movements on or near the touch/display surface 110. In fact, any one or combination of these types of movements could be a gesture. For example, a gesture may be a series of movements, performed in some type of sequential order. In some embodiments, gestures are interpreted differently by program(s) 120 depending on the order and/or type of the user's movements. For example, program 120 may interpret a horizontal touch-and-drag followed by a vertical touch-and-drag (forming a "+") as a "Window Minimize" command whereas this same gesture may be interpreted by a different program 120 as a "Window Close" command. Still other programs may interpret such movements as a "Zoom" command, a "Resize" command, a "Crop" command, a "Rotate Object" command, or any other command that can be interpreted by the program as a command.

In other embodiments, one or more gestures may be identified as the same program command by several programs on the tutorial system. For example, a double-tap gesture may be generally interpreted by several programs 120 and by gesture identification module 130 as a gesture command to select the item or button displayed underneath the area of the motion-sensitive display surface that was double-tapped. It should be noted, however, that the present invention encompasses any type of gesture or series of gestures, performed in any order, regardless of the interpretation by individual programs. As such, any particular example of gestures describe herein should not be used to limit or otherwise narrow the scope of claimed embodiments.

Based on the received user-performed gesture, step for 220 further includes an act of identifying 210 gesture command(s) recognized by a program of the motion-sensitive display surface. For example, gesture identification module 130 may identify gesture command(s) 121 recognized by program 120 of motion-sensitive display surface 110. Based on the received user-performed gesture 105, gesture commands 121 may be selected, which represents actual commands of program 120.

Step for 220 may also include an act of comparing 215 received user-performed gestures to identified gesture commands. For example, comparator module 135 may compare received user-performed gestures 105 from gesture recognition module 115 with those gesture command(s) identified from a program 120. More specifically, gesture identification module 130 (or the program 120 itself) may identify gesture commands 121 of a currently running program 120. These gesture commands 121 can then be compared with the user input 105 for identifying one or more actual gesture commands 121 that closely resemble those corresponding to user-performed gesture 105. Feedback 140, typically in the form of some visual display, may then be provided to the user for suggesting an appropriate gesture command in order to aid the user in understanding appropriate various defined gestures representing actual program commands.

It should be noted that embodiments do not necessarily need to compare identified gesture commands 121 with the user input 105. For example, in one embodiment, the selection of the feedback displayed may be based on historical data recorded. For example, say a user consistently uses a command not recognized by a program 120; however, the tutorial or other component recognizes that the user consistently or typically selects a recognized command as the desired gesture. As such, rather than doing any type of comparison, the tutorial or trainer 125 provides the visual feedback 140 based on this historical observation. As such, there was no comparison between identified commands 121 and the user input 105.

Of course, there are other mechanisms that may be used for basing what feedback 140 will be presented to the user other than comparison and historical data described above. For example, the trainer 125 may note that other programs 120, other than the one the user is interacting with, typically interpret the user input 105 gesture; however, the current application does not. As such, the tutorial 125 may provide feedback 140 based on such recognition, and provide the appropriate option for performing this feature in the current application. In fact, there are any number of bases for which the suggested gestures may be provided as feedback 140 to the user. Accordingly, the comparison, historical data, and other basis for providing the visual and other types and suggested feedback 140 are used herein for illustrative purposes only and are not meant to limit or otherwise narrow the scope of the present invention unless otherwise specifically claimed.

Also note that the actual gesture commands 121 may include any type of command recognized by a hardware or software program (e.g. "Open File," "Print," "Minimize Window," etc.). Also note that the program may accept multiple types of gestures to perform the same command. Further, a user may be allowed to create a gesture that is recognized by one or more programs as a program command. For example, Program X may, by default, accept a double-tap in the top right-hand corner as a "Close Window" command. However, Program X may allow a user to define that a single-tap in the top left-hand corner is an additional or alternative way of entering a "Close Window" command.

Further, visual or other feedback (e.g. feedback 140) may include any type of textual or pictorial depiction of a gesture. In some embodiments, feedback 140 describes, either textually or with one or more pictures, which gesture was recognized as being inputted by the user. In other embodiments, feedback 140 may simply indicate that the input received was or was not the expected input. Feedback 140 may also be superimposed over a visual depiction of a user-performed gesture. For example, if the user inputted a touch-and-drag gesture, a pictorial representation of other gestures may be superimposed over the touch-and-drag gesture as determined by tutorial component 125. In other or similar embodiments, feedback 140 may include a visual deformation of motion-sensitive display surface 110. Similar to the previous example, if a user inputted a touch-and-drag gesture, the surface underneath where the surface was touched and dragged may appear deformed. In some embodiments, this deformation may remain for an extended (e.g., sand or an Etch A Sketch®-like visual display) or shortened duration of time (e.g., wave motion in water or other viscous liquid), after which the deformation may recede. Furthermore, feedback 140 may be displayed dynamically, in real-time, as the user is inputting gestures.

In some embodiments, the system is configured to process and provide feedback 140 for appropriately defined gestures simultaneous with or while the user input 105 is received. Such simultaneous processing and detecting is referred to herein as "speculative recognition." By performing speculative recognition, gesture recognition module 115 can process user inputs 105 and provide appropriate feedback 140 in an efficient manner, thereby enhancing the user experience. In other words, speculative recognition also allows for real-time dynamic feedback, which allows the system to immediately send feedback 140 as the user is performing gestures. Note that the feedback can change as the user's motion changes and/or multiple suggestions may appear (simultaneously or individually) as the users gesture changes.

In other embodiments, a pre-defined degree of variance is used to identify the user-performed gesture command based on the difference between the user-performed gesture and a recognized gesture. For example, a user or administrator may define the degree of variance to be within 0.25" in length for dragging length, or may define a waiting period of perhaps 0.5 seconds between taps for a double-tap gesture. It should be noted that these gestures and values were chosen arbitrarily. Degrees of variance may be used in multiple ways to distinguish between user-performed gesture and a gesture recognized by gesture recognition module 115.

Figure 4A:
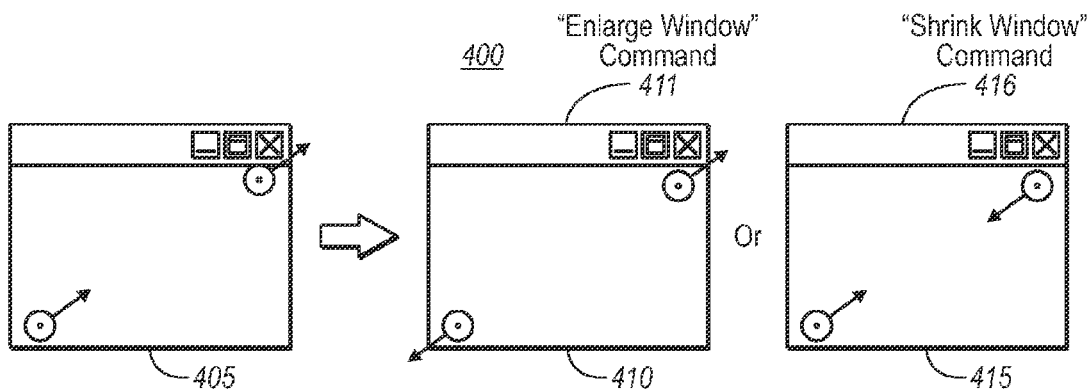
FIGS. 4A-4C illustrate examples of providing visual feedback based on identified user-performed gestures.
Figure 4B:
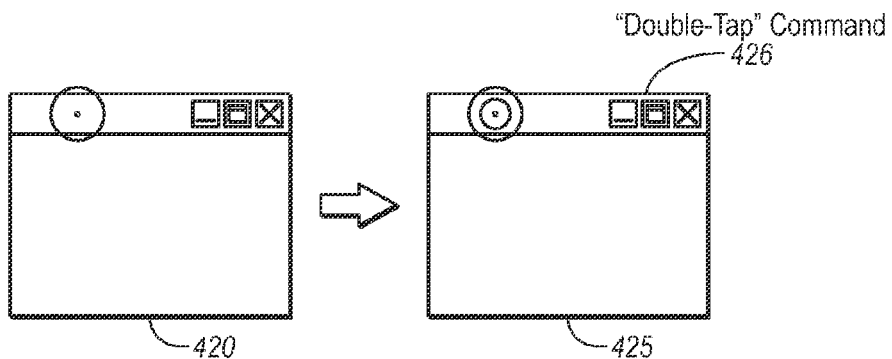
Figure 4C:
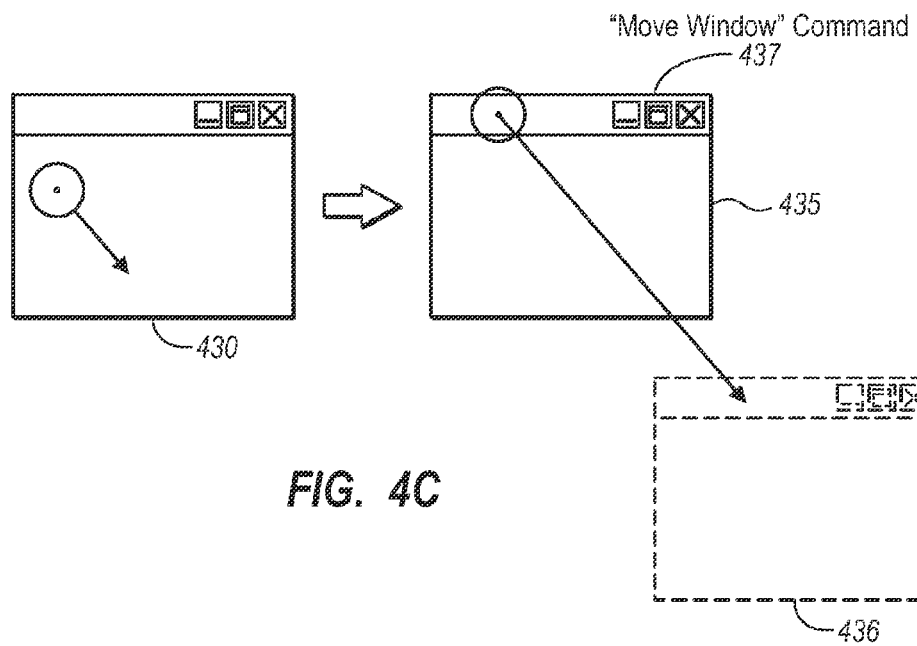

FIGS. 4A-4C include computing system environment 400 with illustrates some examples of the embodiments described above. For example as shown in FIG. 4A, a user may be trying to resize a window 405; however, the user may be inputting an unrecognized command. For instance, the user may touch the window 405 at opposite corners of the window and drag their fingers in the same direction as shown. The trainer may recognize using any of the above described mechanisms that such move is improper or other was not recognizable. Accordingly, the trainer 125 may suggest the commands of "Enlarge Window" (shown as touching window 410 on opposing corners and dragging one's fingers toward each other) and/or "Shrink Window" (shown as touching window 415 on opposing corners and dragging one's fingers away from each other). Note that the display may include labels 411 and 416 along with some other form of visual display as described herein.

FIG. 4C illustrates another example of suggesting the appropriate commands in accordance with example embodiments. In this example, the user may have desired to move the window 430 from one position on the screen to some other. Accordingly, the user may have touched the window below the toolbar and dragged their finger or other object in a diagonal downward direction as shown. The program 120, however, may require that such movement be performed by first touching the window within the toolbar. As such, tutorial component 125 recognizes the user's intent based on any of the mechanisms describe above, and can then provide the appropriate feedback 140 to suggest the "Move Window" command 437 as shown using windows 435 and 436.

FIG. 3 illustrates a flowchart of a method 300 for providing a gesture tutorial or trainer mechanism for instructing one or more users how to properly enter program commands via the motion-sensitive display surface using gestures. The method 300 will now be described with frequent reference to the components and data of environment 100 and the examples shown in FIGS. 4A-4C.

Method 300 includes an act of identifying 305 gesture command(s) recognized by a program of a motion-sensitive display surface. Note that the motion-sensitive display surface 110 is configured to detect user movement of an object (e.g., appendage, writing utensil, etc.) over the surface 110 that recognizes such user interaction therewith. For example, tutorial component 125 may be used to identify one or more gesture commands (e.g. gesture commands 121) recognized by program 120, with motion-sensitive display surface 110 configured to detect user movement (e.g., user input 105) of an object over the surface that recognizes such user interaction therewith. As explained above, motion-sensitive display surface 110 may be used in conjunction with tutorial component 125 and gesture recognition module 115 to allow users to interact with the surface and learn how to input gestures that are recognized as valid program commands. Also as previously explained, the gesture commands 121 identified may be part of an actual program 120 and/or general or universal commands stored as part of the tutorial 125 session.

Method 300 also includes an act of displaying 310 a visual example of a performable gesture. For example, tutorial component 125 can provide a gesture example 145, capable of being performed on the motion-sensitive display surface 10. Note that the visual example 145 of the gesture mimics motion(s) a user may perform for executing gesture commands 121 of a program 120 associated with the motion-sensitive display surface.

In some embodiments, gesture example 145 corresponds to a command generally recognized by tutorial component 125, which may include any combination of modules or components described herein. In some cases, gesture example 145 may correspond to any command recognized by any of the modules in FIG. 1 including program 120. For example, gesture example 145 may depict a gesture that is generally or universally interpreted by several programs 120 as the same command. For example, all modules within computing device 101 may interpret a double-tap in the upper left-hand corner of a program window as a command to close that window. In other embodiments, example gesture 145 may correspond to a command associated with the program the user is currently using.

Method 300 includes an optional act of detecting 315 a user-performed gesture at the motion-sensitive display surface. For example, motion-sensitive display surface 10 may detect user input 105. User input 105 can be any type, number, or sequence of user-performed gestures, which are performed in an attempt to mimic the example gesture command 145. If this optional act is performed, Method 300 then includes an act of determining 320 if the user-performed gesture appropriately corresponded to the example gesture. For example, tutorial component 125 may determine if the user-performed gesture appropriately corresponded to example gesture 145 based on the user-performed gesture.

In such embodiments, Method 300 also includes an act of indicating 325 that the user-performed gesture was not proper based upon the determination. For example, if tutorial component 125 determined that the user-performed gesture did not appropriately correspond to example gesture 145 (a determination of NO in act 320), tutorial component 125 may indicate via motion-sensitive display surface 110 or other output device 150 that the user-performed gesture 105 was not proper. In some embodiments, a user-performed gesture is not proper if it does not correspond to gesture example 145. In other embodiments, a user-performed gesture is not proper if it is not recognized by gesture recognition module 115. Furthermore, a user-performed gesture 105 may not be proper if, although recognized by gesture recognition module 115, the gesture 105 is not identified as a gesture command 121 by program 120 or by gesture identification module 130.

In a similar embodiment, Method 300 further includes an act of indicating 330 that the user-performed gesture was proper based upon the determination. For example, if tutorial component 125 determined that the user-performed gesture did appropriately correspond to example gesture 145 (a determination of YES in act 320), tutorial component 125 may indicate via motion-sensitive display surface 110 or other output device 150 that the user-performed gesture 105 was proper. In some embodiments, a user-performed gesture 105 is proper if it corresponds to gesture example 145. In other embodiments, a user-performed gesture 105 is proper if it is recognized by gesture recognition module 115. Furthermore, a user-performed gesture 105 may be proper if both recognized by gesture recognition module 115 and identified as a gesture command 121 by program 120 or by gesture identification module 130. Thus, through the use of feedback and exemplary gestures, users can learn to properly and efficiently use a computing system that allows input via gestures.

Similar to embodiments described above, a pre-defined degree of variance may be used to identify the success or failure of the user-performed gesture based on the difference between the user-performed gesture 105 and the example gesture 145. As explained above, the system may be configured to a pre-defined degree of variance when identifying the success of the user's mimicking based on the difference between the user-performed gesture and a gesture that was recognized by gesture recognition module 115. Furthermore, gesture recognition module 115 can be configured to process the user inputs 105 while the gesture example 145 is being displayed. Using this method of speculative recognition (similar to that described above), real-time feedback 140 can be provided to the user.

In one embodiment, motion-sensitive display surface 10 may display one or more example gesture 145 (e.g. exemplary windows 415, 425, or 435 and 436), as shown in FIGS. 4A, 4B and 4C, respectively. In one example, a user may be attempting to resize a program window. In some embodiments, gesture example 145 may be labeled with a label that indicates the gesture command displayed by gesture example 145. In FIG. 4A, for example, exemplary windows 410 and/or 415 may be shown on motion-sensitive display surface 110 as either of these gestures, when performed, would be recognized by program 120 as a "Resize Window" command. The user would be able to view the "Enlarge Window" command 411 and/or the "Shrink Window" command 416. As shown in FIG. 4A, however, the user may input an incorrect gesture for the desired command as shown in exemplary window 405 (i.e. the user did not input either the gesture depicted in exemplary window 410 or in exemplary window 415). In some cases, motion-sensitive display surface 110 may be configured to display the recognized input in real-time using speculative recognition. In this example, the recognized user input was a touch-and-drag in the bottom left-hand corner and a touch-and drag in the top right-hand corner in a diagonal motion (window 405).

Upon determining that the gesture was not recognized or proper (e.g., based on the comparison of the example gesture 145 with the user input 105), motion-sensitive display surface 10 may provide examples of how to correctly input either an "Enlarge Window" command 411 or a "Shrink Window" command 416, as previously described. More explicitly, exemplary window 410 shows a touch-and-drag in the lower left-hand corner and a touch-and-drag in the upper right-hand corner, each finger being dragged in an opposite direction. Similarly, in exemplary window 415, each finger is depicted as being dragged toward the other. In some embodiments, exemplary window 410 depicts a gesture to enlarge the program window and exemplary window 415 depicts a gesture to shrink the program window. It should be noted that these gestures may be interpreted differently by different programs and that other gestures may be used in addition or alternative to the gestures mentioned in the above example. In other embodiments, labels may be similarly be used to describe commands such as the "Double-tap" command 426 shown in exemplary window 425 and the "Move Window" command 437 shown in exemplary window 435.

In other embodiments, a user may see, as an example, a gesture involving a double-tap, as depicted in exemplary window 425. The double-tap, in this case, is represented by a dot with two circles around the dot. If the user attempts to double-tap the window and only succeeds at single-tapping the window, the result may be shown in window 420 with a dot with a single circle around it. Exemplary window 425 may be displayed on motion-sensitive display surface 110 to show the user what is expected to initiate a double-tap command. Additionally, feedback 140 may be used to indicate whether the user-performed gesture 105 was performed properly or not. It should be noted that while these examples use fingers touching the motion-sensitive display surface, other objects used for defining movement, such as those listed above, are also encompassed in the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a gesture recognition tutorial system including a motion-sensitive display surface capable of recognizing various forms of user interaction with the surface, a method of suggesting recognized application gesture commands based on the user interaction with the surface in order to give the user various options and/or instructions on how to appropriately use the application for the motion-sensitive display surface, the method comprising:

receiving at a motion-sensitive display surface a user-performed gesture, which includes user movement of an object over the surface that recognizes such user interaction therewith;

determining that the received user-performed gesture is an unrecognized command, the gesture not corresponding to gesture commands recognized by one or more programs running on the gesture recognition tutorial system's motion-sensitive display surface;

based on the determination, identifying one or more gesture commands that are similar to the received user-performed gesture that are recognizable by the one or more programs of the motion-sensitive display surface, wherein the one or more gesture commands recognized by the program represent actual commands of the program; and displaying one or more exemplary gesture commands recognized by the one or more programs in order to aid the user in understanding appropriate various defined gestures representing actual program commands, the exemplary gesture commands comprising one or more graphical, non-textual images that depict a series of one or more object motions or movements performable by the user that form a recognized command, recognizable by the motion-sensitive display surface.

2. The method of claim 1, wherein the user movement includes one or more of tapping, touching, touching and holding for a specified time, sliding, waving, flicking or dragging.

3. The method of claim 1, wherein the object is one or more of a bodily appendage, writing utensil, stylus, dice, paint brushes, cellular telephones, coins, poker chips, or radio frequency identification (RFID) tagged object.

4. The method of claim 1, wherein the user-performed gesture closely resembles one or more gestures commands for one or more programs.

5. The method of claim 4, wherein a pre-defined degree of variance is used to identify the gesture command based on the difference between the user-performed gesture and a recognized gesture.

6. The method of claim 1, further comprising interacting with the user to determine whether the displayed gesture was the gesture intended by the user's movement input.

7. The method of claim 1, wherein the displayed exemplary gesture commands comprise textual information.

8. The method of claim 1, wherein the displayed exemplary gesture commands comprise pictorial information.

9. The method of claim 1, wherein the displayed exemplary gesture commands are superimposed over a visual depiction of the user-performed gesture.

10. The method of claim 1, wherein the displayed exemplary gesture commands comprise a visual deformation of the motion-sensitive display surface.

11. The method of claim 1, wherein the displayed exemplary gesture commands are displayed in real-time, as the user is inputting gestures.

12. The method of claim 1, further comprising allowing the user to create a gesture that is recognized by one or more programs as a program command.

13. The method of claim 1, wherein the gesture recognition tutorial system processes all possible inputs within the context of the detected movement inputs while the gesture is being performed.

14. The method of claim 13, further comprising dynamically displaying the possible interpretations of the user's gestures inputs in real-time.

15. At a gesture recognition tutorial system including a motion-sensitive display surface capable of recognizing various forms of user interaction with the surface simultaneously from a plurality users, a method of providing a gesture tutorial mechanism for instructing one or more users how to properly enter program commands via the motion-sensitive display surface using gestures, the method comprising:
    determining that a received user-performed gesture is an unrecognized command, the gesture not corresponding to gesture commands recognized by one or more programs running on the gesture recognition tutorial system's motion-sensitive display surface;
    identifying one or more gesture commands similar to the received user-performed gesture that are recognized by a program of a motion-sensitive display surface, the motion-sensitive display surface being configured to detect multiple simultaneous user movements of objects over the surface from a plurality of simultaneous motion-sensitive display surface users, the surface being configured to recognize such multi-user interaction therewith; and
    based on the identified one or more gesture commands, displaying a visual example of a gesture capable of being performed on the motion-sensitive display surface, wherein the visual example of the gesture comprises one or more graphical, non-textual images that depict one or more motions a user can perform for executing the one or more gesture commands of a program running on the motion-sensitive display surface.

16. The method of claim, 15 further comprising:
    at the motion-sensitive display surface, detecting a user-performed gesture;
    based on the user-performed gesture, determining if the user-performed gesture appropriately corresponded to the example gesture; and
    based upon the determination, indicating whether or not the user-performed gesture was proper.

17. The method of claim 15, wherein the visual example gesture corresponds to a command generally recognized by the gesture recognition tutorial system.

18. The method of claim 15, wherein the gesture recognition tutorial system processes all possible inputs within the context of the detected user movements while the gesture is being performed.

19. The method of claim 15, further comprising labeling the visual example with a label that indicates the gesture command displayed in the visual example.

20. At a gesture recognition tutorial system including a motion-sensitive display surface, a computer program product comprising one or more recordable-type computer-readable storage media having thereon computer-executable instructions that, when executed by one or more processors of a computer system, cause the computer system to perform a method for suggesting recognized application gesture commands based on the user interaction with the surface, the method comprising:
    receiving at a motion-sensitive display surface a user-performed gesture, which includes user movement of an object over the surface that recognizes such user interaction therewith;
    determining that the received user-performed gesture is an unrecognized command, the gesture not corresponding to gesture commands recognized by one or more programs running on the gesture recognition tutorial system's motion-sensitive display surface;
    based on the determination, identifying one or more gesture commands that are similar to the received user-performed gesture that are recognizable by the one or more programs running on the gesture recognition tutorial system's motion-sensitive display surface, the identified commands representing actual commands of the program; and
    displaying one or more exemplary gesture commands recognized by the one or more programs in order to aid the user in understanding appropriate various defined gestures representing actual program commands, the exemplary gesture commands comprising one or more graphical, non-textual images that depict a series of one or more object motions or movements performable by the user that form a recognized command, recognizable by the motion-sensitive display surface.

* * * * *

UNITED STATES PATENT AND TRADEMARK OFFICE
CERTIFICATE OF CORRECTION

| | | |
|---|---|---|
| PATENT NO. | : 7,770,136 B2 | Page 1 of 1 |
| APPLICATION NO. | : 11/626794 | |
| DATED | : August 3, 2010 | |
| INVENTOR(S) | : Langdon W. Beeck et al. | |

It is certified that error appears in the above-identified patent and that said Letters Patent is hereby corrected as shown below:

In column 9, line 19, delete "with" and insert -- which --, therefor.

Signed and Sealed this
Twenty-fourth Day of May, 2011

David J. Kappos
*Director of the United States Patent and Trademark Office*